United States Patent
Bajko et al.

(10) Patent No.: US 10,470,106 B2
(45) Date of Patent: Nov. 5, 2019

(54) METHOD AND APPARATUS FOR JOINT ASSOCIATION AND ADDRESS PROVISIONING

(75) Inventors: Gabor Bajko, Sunnyvale, CA (US); Basavaraj Patil, Dallas, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 760 days.

(21) Appl. No.: 13/822,903

(22) PCT Filed: Aug. 8, 2011

(86) PCT No.: PCT/FI2011/050698
§ 371 (c)(1),
(2), (4) Date: Oct. 28, 2013

(87) PCT Pub. No.: WO2012/035198
PCT Pub. Date: Mar. 22, 2012

(65) Prior Publication Data
US 2014/0050209 A1 Feb. 20, 2014

Related U.S. Application Data

(60) Provisional application No. 61/382,475, filed on Sep. 13, 2010.

(51) Int. Cl.
*H04W 48/16* (2009.01)
*H04W 72/04* (2009.01)
(Continued)

(52) U.S. Cl.
CPC ....... *H04W 48/16* (2013.01); *H04L 29/12283* (2013.01); *H04L 61/2007* (2013.01);
(Continued)

(58) Field of Classification Search
CPC ............. H04W 36/0033; H04W 48/16; H04W 72/0426; H04W 92/20; H04W 48/20; H04Q 7/00; H04B 7/024; H04L 61/2007
See application file for complete search history.

(56) References Cited

U.S. PATENT DOCUMENTS

| 6,775,285 B1 * | 8/2004 | Moles | H04L 29/06 370/392 |
| 7,269,448 B2 * | 9/2007 | Choi | H04L 29/06 455/574 |

(Continued)

FOREIGN PATENT DOCUMENTS

| EP | 1 505 799 A1 | 2/2005 |
| WO | WO-2009/113976 A1 | 9/2009 |

OTHER PUBLICATIONS

Longjiang Li, Yuming Mao and Yonggang Li, "Resource-efficient care-of address provisioning for seamless IPv6 mobility support," 2008 International Conference on High Performance Switching and Routing, Shanghai, 2008, pp. 137-142. doi: 10.1109/HSPR.2008.4734434.*

(Continued)

*Primary Examiner* — Raj Jain
(74) *Attorney, Agent, or Firm* — Alston & Bird LLP

(57) ABSTRACT

In accordance with an example embodiment of the present invention, there is provided an apparatus receiving or storing an indicator relating to an access point, the indicator indicating whether the first access point supports joint association and address provisioning. The apparatus is configured to transmit a request for joint association and address provisioning toward the access point, and to receive from the access point a response to the request for joint association and address provisioning.

18 Claims, 3 Drawing Sheets

(51) Int. Cl.
  *H04L 29/12* (2006.01)
  *H04W 48/20* (2009.01)
  *H04W 48/10* (2009.01)
  *H04W 88/00* (2009.01)

(52) U.S. Cl.
  CPC ..... *H04L 61/2061* (2013.01); *H04W 72/0426* (2013.01); *H04W 48/10* (2013.01); *H04W 48/20* (2013.01); *H04W 88/005* (2013.01)

(56) References Cited

U.S. PATENT DOCUMENTS

| | | | |
|---|---|---|---|
| 7,596,376 B2 | 9/2009 | Calhoun et al. | |
| 7,975,056 B2* | 7/2011 | Gmuender | H04L 29/06 709/228 |
| 2002/0034945 A1* | 3/2002 | Hamada | H04W 8/02 455/435.1 |
| 2005/0128988 A1* | 6/2005 | Simpson | H04W 48/16 370/338 |
| 2005/0174998 A1* | 8/2005 | Vesterinen | H04L 29/12216 370/354 |
| 2005/0208948 A1* | 9/2005 | Hori | H04W 76/10 455/452.1 |
| 2006/0050673 A1 | 3/2006 | Park et al. | |
| 2006/0056351 A1* | 3/2006 | Wall | H04W 36/0033 370/331 |
| 2006/0073840 A1* | 4/2006 | Akgun | H04W 8/04 455/456.3 |
| 2007/0073868 A1* | 3/2007 | Nelson | H04L 63/0823 709/224 |
| 2007/0140197 A1* | 6/2007 | Sawada | H04W 76/14 370/338 |
| 2007/0254625 A1* | 11/2007 | Edge | H04M 7/0078 455/404.1 |
| 2007/0275701 A1* | 11/2007 | Jonker | H04W 48/16 455/414.1 |
| 2007/0275726 A1* | 11/2007 | Lee | H04W 36/0016 455/436 |
| 2007/0286152 A1 | 12/2007 | Prakash et al. | |
| 2007/0291668 A1* | 12/2007 | Duan | H04B 7/15535 370/280 |
| 2007/0297362 A1* | 12/2007 | Kimura | H04W 36/0033 370/329 |
| 2008/0019293 A1* | 1/2008 | Chang | H04W 88/16 370/310 |
| 2008/0076419 A1* | 3/2008 | Khetawat | H04L 12/66 455/435.1 |
| 2008/0076436 A1* | 3/2008 | Sanders | H04W 76/15 455/450 |
| 2008/0291867 A1* | 11/2008 | Weniger | H04W 8/12 370/328 |
| 2008/0318571 A1* | 12/2008 | Vikberg | H04W 60/04 455/435.2 |
| 2009/0028120 A1* | 1/2009 | Lee | H04W 48/16 370/338 |
| 2009/0052395 A1* | 2/2009 | Bao | H04W 48/12 370/331 |
| 2009/0059835 A1* | 3/2009 | Motegi | H04L 12/185 370/312 |
| 2009/0180437 A1* | 7/2009 | Kanazawa | H04W 36/0016 370/331 |
| 2009/0185529 A1* | 7/2009 | Tsuji | H04W 28/18 370/329 |
| 2009/0197633 A1* | 8/2009 | Kawamoto | H04W 52/54 455/522 |
| 2009/0245176 A1* | 10/2009 | Balasubramanian | H04W 48/20 370/328 |
| 2009/0247170 A1* | 10/2009 | Balasubramanian | H04W 48/16 455/445 |
| 2010/0173660 A1* | 7/2010 | Liu | H04W 48/16 455/501 |
| 2011/0268007 A1* | 11/2011 | Barany | H04B 7/024 370/312 |
| 2014/0050209 A1* | 2/2014 | Bajko | H04L 29/12283 370/338 |

OTHER PUBLICATIONS

L. Luo, D. Raychaudhuri, H. Liu, M. Wu and D. Li, "Joint Association, Routing and Bandwidth Allocation for Wireless Mesh Networks," IEEE GLOBECOM 2008—2008 IEEE Global Telecommunications Conference, New Orleans, LO, 2008, pp. 1-6. doi: 10.1109/GLOCOM.2008.ECP.122.*

Longjiang Li, Yuming Mao and Yonggang Li, (LI hereinafter) "Resource-efficient care-of address provisioning for seamless IPv6 mobility support," 2008 International Conference on High Performance Switching and Routing, Shanghai, 2008, pp. 137-142, doi: 10.1109/HSPR.2008.4734434.*

Longjiang Li, Yuming Mao and Yonggang Li, (Li hereinafter) "Resource-efficient care-of address provisioning for seamless IPv6 mobility support," 2008 International Conference on High Performance Switching and Routing, Shanghai, 2008, pp. 137-142, doi: 10.1109/HSP8.2008.4734434.*

L. Luo, D. Raychaudhuri, H. Liu, M. Wu and D. Li, (LLUO-2 hereinafter)"Joint Association, Routing and Bandwidth Allocation for Wireless Mesh Networks," IEEE Globecom 2008—2008 IEEE Global Telecommunications Conference, New Orleans, LO, 2008, pp. 1-6. doi: 10.1109/GLOCOM.2008.ECP.122.*

I. Herwono, J. Sachs and R. Keller, "Performance Improvement of Media Point Network using the Inter Access Point Protocol according to IEEE 802.11f," 11th European Wireless Conference 2005—Next Generation wireless and Mobile Communications and Services, Nicosia, Cyprus, 2005, pp. 1-7.*

I. Herwono, J. Sachs and R. Keller, "Performance Improvement of Media Point Network using the Inter Access Point Protocol according to IEEE 802.11f," 11th European Wireless Conference 2005—Next Generation wireless and Mobile Communications and Services, Nicosia, Cyprus, 2005, pp. 1-7 (Year: 2005).*

International Search Report for Application No. PCT/FI2011/050698; dated Oct. 13, 2011.

International Written Opinion for Application No. PCT/FI2011/050698; dated Oct. 13, 2011.

Extended European Search Report for European Patent Application No. 11824630.5 dated Nov. 30, 2016, 7 pages.

Substantive Examination Report Stage 1 for Indonesian Patent Application No. W00 2013 01456, dated Dec. 13, 2016, 2 pages.

Hwang, S.-H. et al., "An Address Configuration and Confirmation Scheme for Seamless Mobility Support in IPv6 Network", *WWIC* 2004, 74-86.

Office Action for corresponding European Application No. 11824630.5 dated Sep. 7, 2017, 6 pages.

* cited by examiner

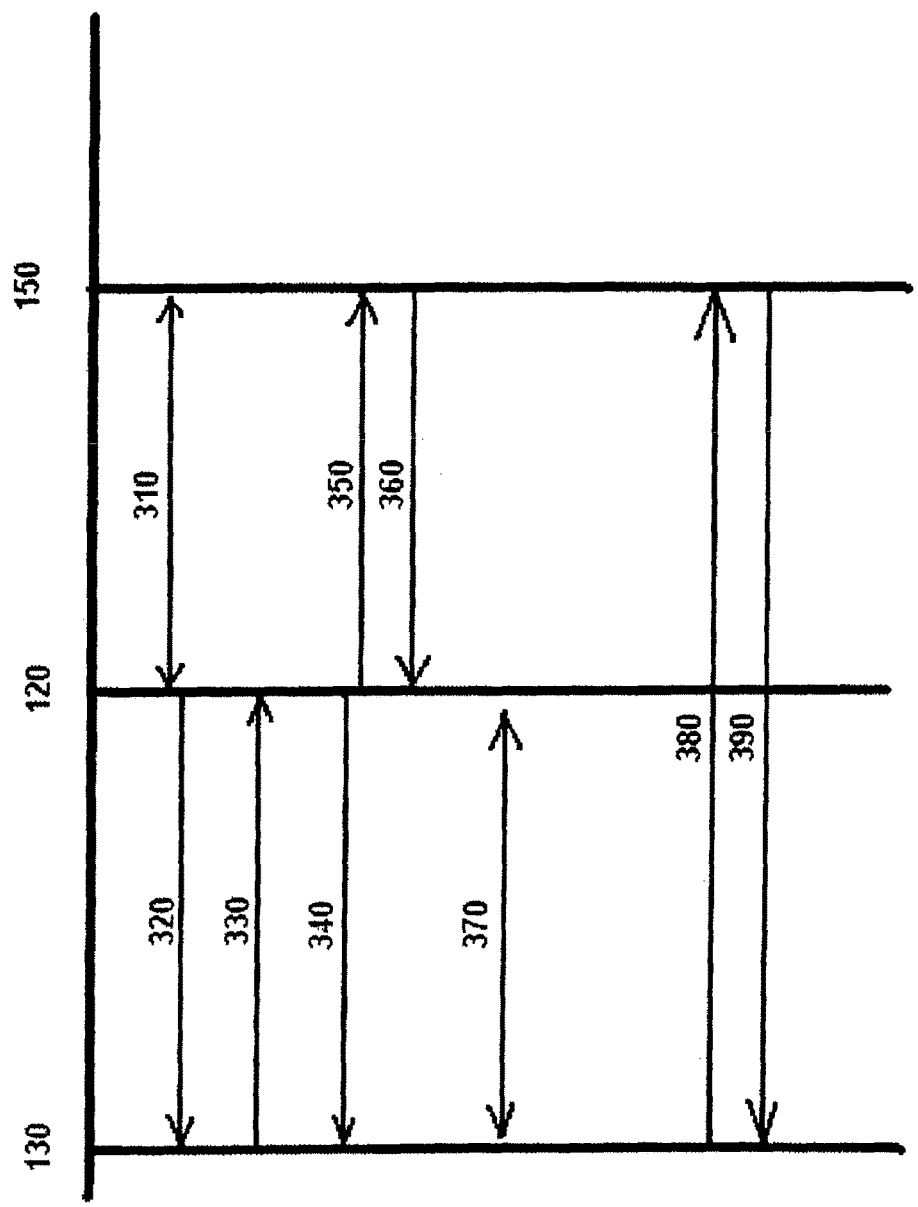

METHOD AND APPARATUS FOR JOINT ASSOCIATION AND ADDRESS PROVISIONING

TECHNICAL FIELD

The present application relates generally to wireless communications in the context of address-based communications and address provisioning.

BACKGROUND

Wireless communications comprises cellular and non-cellular wireless communications. Cellular technologies include wideband code division multiple access, WCDMA, and global system for mobile communication, GSM, technologies, for example. Non-cellular technologies include WiFi, also known as 802.1x, and ad-hoc communications, for example. In the context of non-cellular communications, mobile devices may be provisioned with addresses such as internet protocol, IP, addresses for use in communication with further nodes, for example by using a 802.1x radio access point as a way to reach the internet.

Mobile devices may be furnished with connectivity via both cellular and non-cellular technologies, which the mobile device may be configured to use depending on various parameters, such as a quality-of-service requirement of a data flow or a price of a connection. Cellular systems employ handover mechanisms that are designed to provide a seamless mobility experience to users, while non-cellular systems may have more attractive pricing or offer a higher datarate, for example.

As a mobile device moves, it may change its attachment from a first to a second access point responsive to determining that the second access point offers a more favourable radio path. In conjunction with the change in attachment, continuity of communication may need to be ensured, including continuity of IP-based communication, for example. Where coordination between the first and second access points is lacking, for example when they belong to different non-cellular networks, the mobile device can perform an initial access procedure to obtain connectivity through the second access point to replace connectivity through the first access point. When a mobile device powers on from an unpowered state, it needs to be provisioned with an address to participate in address-based communication.

IP based addressing occurs in two primary variants, internet protocol version 4 known as IPv4 and internet protocol version 6 known as IPv6.

SUMMARY

Various aspects of examples of the invention are set out in the claims.

According to a first aspect of the present invention there is provided an apparatus, comprising memory configured to store an indicator relating to a first access point, the indicator indicating whether the first access point supports joint association and address provisioning, a transmitter configured to transmit a request for joint association and address provisioning toward the first access point, and a receiver configured to receive from the first access point an association response comprising at least one address provisioning parameter.

According to a second aspect of the present invention there is provided an apparatus, comprising at least one processor, at least one memory including computer program code, the at least one memory and the computer program code configured to, with the at least one processor, cause the apparatus to perform at least broadcasting a beacon message comprising an indication the apparatus supports joint association and address provisioning, receiving a request message from a terminal requesting joint association and address provisioning, and transmitting an association response message responsive to receiving the request message, the association response message comprising address provisioning information.

According to a third aspect of the present invention, there is provided a computer program product comprising a computer-readable medium bearing computer program code embodied therein for use with a computer, the computer program code comprising code for broadcasting a beacon message comprising an indication the apparatus supports joint association and address provisioning, code for receiving a request message from a terminal requesting joint association and address provisioning, and code for transmitting an association response message responsive to receiving the request message, the association response message comprising address provisioning information.

According to a fourth aspect of the present invention, there is provided a computer program product comprising a computer-readable medium bearing computer program code embodied therein for use with a computer, the computer program code comprising code for storing an indicator relating to a first access point, the indicator indicating whether the first access point supports joint association and address provisioning, code for transmitting a request for joint association and address provisioning toward the first access point, and code for receiving from the first access point a response to the request for joint association and address provisioning.

BRIEF DESCRIPTION OF THE DRAWINGS

For a more complete understanding of example embodiments of the present invention, reference is now made to the following descriptions taken in connection with the accompanying drawings in which:

FIG. 3 is a messaging diagram illustrating operations relating to some embodiments of the present invention.

DETAILED DESCRIPTION OF THE DRAWINGS

Figure 1:
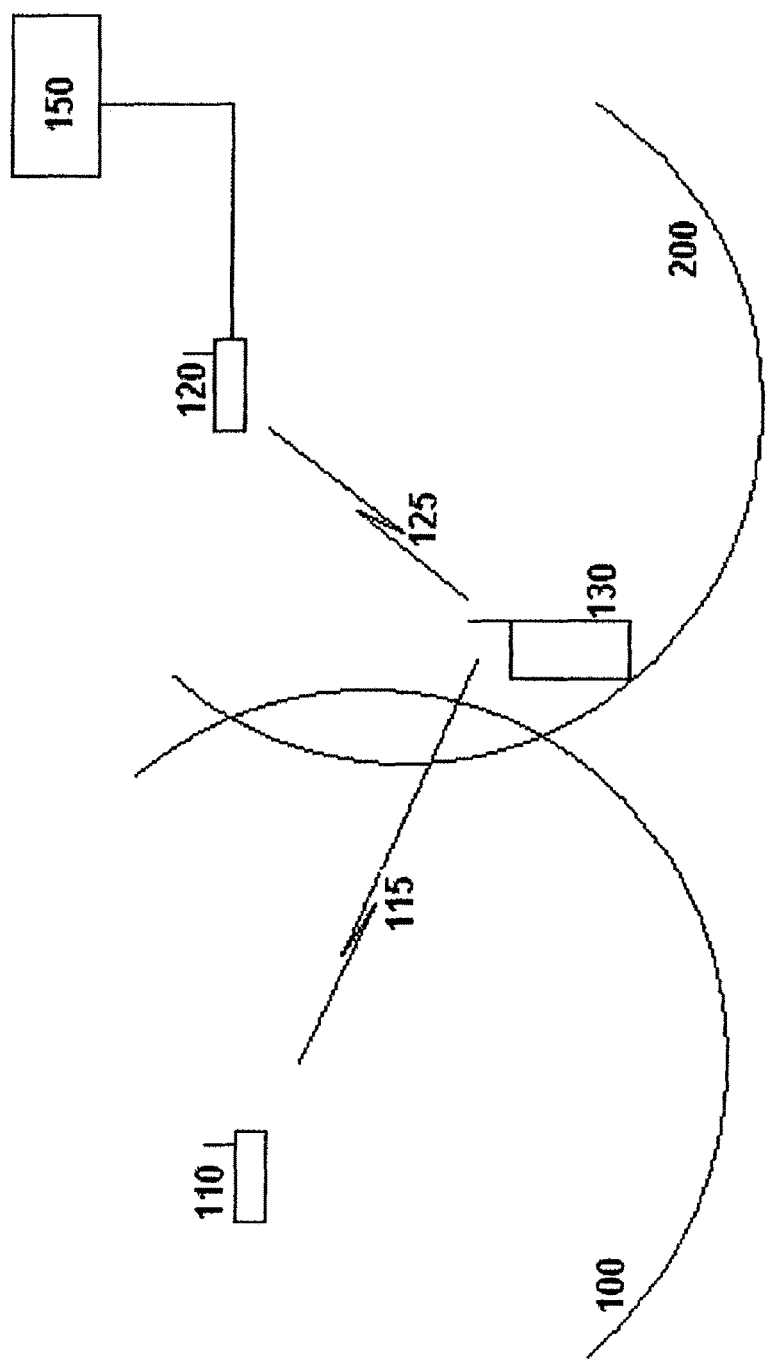
FIG. 1 illustrates an example system capable of supporting some embodiments of the present invention.
Figure 2:
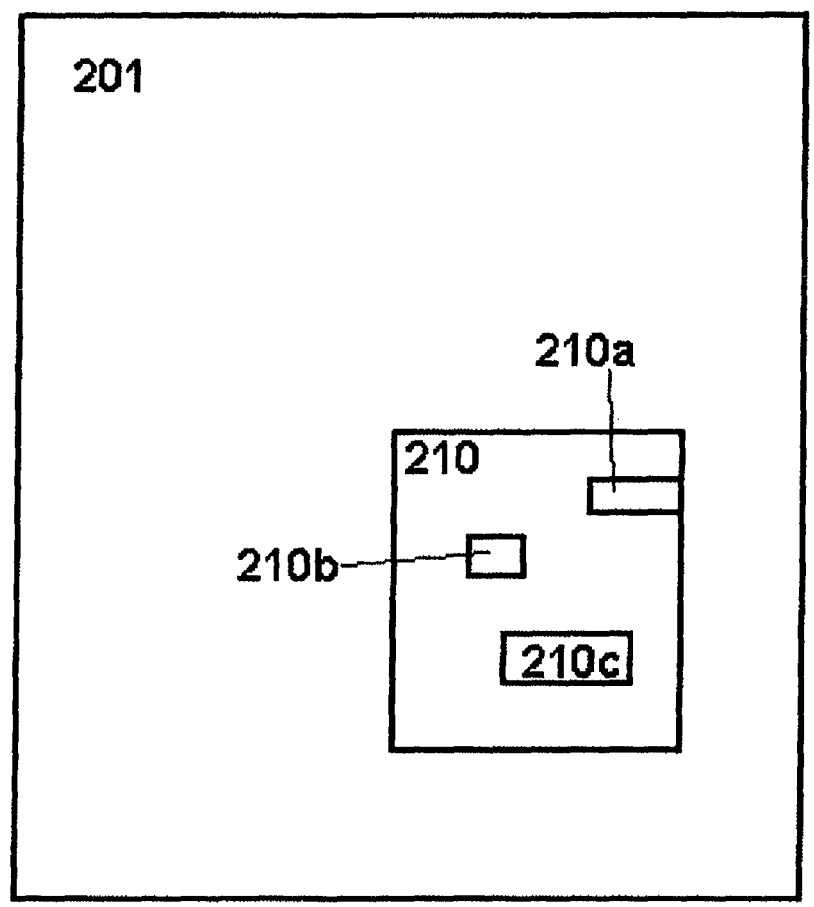
FIG. 2 illustrates an example apparatus capable of supporting embodiments of the present invention.

An example embodiment of the present invention and its potential advantages are understood by referring to FIGS. 1 through 3 of the drawings.

FIG. 1 illustrates an example system capable of supporting some embodiments of the present invention. Terminal 130, for example a mobile device or user equipment, is illustrated near the center of the figure. Access point 110 communicates within its area 100, for example according to a 802.1x technology. Access point 120 communicates within its area 200, for example but not necessarily according to the same technology as access point 110. Terminal 130 communicates with access point 110 via radio link 115, which may comprise an uplink conveying information from terminal 130 to access point 110 and a downlink conveying information from access point 110 to terminal 130. Terminal 130 communicates with access point 120 via radio link 125, which may comprise an uplink conveying information from terminal 130 to access point 120 and a downlink conveying information from access point 120 to terminal 130. Radio links 115 and 125 may be based on frequency division duplex, FDD, or time division duplex, TDD, principles, for example. Orthogonal frequency division multiple access, OFDMA, and/or code division multiple access, CDMA, may be used, for example, to share radio resources with other terminals, which are not illustrated in FIG. 1. To illustrate concepts relating to the present invention, it can be assumed terminal 130 has moved from area 100 to area 200. In this example, terminal 130 has relinquished radio link 115 to access point 110 responsive to a determination that radio link 125 to access point 120 offers better connectivity.

Terminal 130 may comprise a radio receiver configured to receive beacon transmissions from access point 120. Beacon transmissions may comprise a service set identifier, SSID, identifying access point 120 in embodiments where access point 120 conforms to a 802.11 technology. Beacons may be broadcast to terminals, meaning that they are sent without defining any particular terminal as a receiver of the beacon. Terminal 130 may be configured to determine based on the beacon from access point 120 that communicating via access point 120 may be preferable to communicating via another access point, such as access point 110. This may be the case, for example, when terminal 130 receives a beacon from access point 120 at a higher apparent power leven than beacons from other access points, which may imply that access point 120 is nearer or at least the radio path to access point 120 is stronger than radio paths to other access points such as access point 110. Another example is one where terminal 130 receives a beacon from access point 120 indicating support for joint association and address provisioning, and responsively selects to associate with that access point as terminal 130 is configured to prefer the joint procedure.

Responsive to determining that communicating via access point 120 is preferable, terminal 130 may be configured to initiate connectivity toward access point 120 by transmitting a message to access point 120 via a radio transmitter comprised in terminal 130. Obtaining connectivity via access point 120 may comprise three stages: association, authentication and address provisioning. An example of address provisioning is provisioning an IP address, such as IPv4 or IPv6 address. Association and authentication may be layer 2 procedures, while address provisioning may be a layer 3 procedure. In embodiments where access point 120 provides free access, the authentication phase is unnecessary and obtaining connectivity only comprises association and address provisioning.

IP connectivity via access point 120 may be obtained faster if association and address provisioning is performed as a joint process, instead of a sequential process where address provisioning is initiated responsive to completion of association. A joint process may be termed joint association and address provisioning. In robust security network, RSN, enabled networks, address provisioning may be initiated responsive to completion of both association and authentication. Terminal 130 may obtain information on whether access point 120 supports a joint association and address provisioning procedure. Terminal 130 may obtain this information by being pre-configured to store it or from a beacon transmission from access point 120. Pre-configuring may comprise that terminal 130 is furnished with a list of access points, identified for example by SSID, that support joint association and address provisioning. Obtaining the information from a beacon may comprise receiving a beacon comprising an indication whether the access point that transmitted the beacon supports joint association and address provisioning. The indication may take the form of a dedicated bit or a pre-defined value indicated in a bitfield comprised in the beacon, for example.

The information that access point 120 supports joint association and address provisioning, whether obtained via beacon or pre-configured, may comprise further information relating to the joint procedure. This further information may comprise that the access point supports the joint procedure for provisioning an IPv4 address, an IPv6 address or either an IPv4 address or an IPv6 address.

Responsive to information that access point 120 supports joint association and address provisioning, terminal 130 may be configured to transmit to access point 120 an association request comprising an indication that terminal 130 requests joint association and address provisioning. In embodiments where the information that access point 120 supports joint association and address provisioning comprises further information, the association request may further comprise an indication that an IPv4 address, or alternatively an IPv6 address, is desired. These indications may take the form of dedicated bits or pre-defined values indicated in a bitfields, for example. By including this indication in an association request, terminal 130 indicates that it supports joint association and address provisioning.

Responsive to receiving an association request comprising an indication that joint association and address provisioning is requested from terminal 130, access point 120 may be configured to initiate the joint procedure. The joint procedure may comprise that access point 120 initiates IP address provisioning during the association procedure. During such a procedure, association and IP provisioning happen at least in part in parallel. Association may comprise one message exchange between terminal 130 and access point 120 and IP address provisioning may comprise one or two message exchanges between terminal 130 and a dynamic host configuration protocol, DHCP, server 150. Alternatively, in embodiments disclosed herein IP address provisioning may comprise a joint message exchange between terminal 130 and access point 120. DHCP server 150 may be operationally connected to access point 120.

In some embodiments, in a joint association and address provisioning procedure, IP provisioning may be completed before authentication is complete. In these embodiments, an access system in which access point 120 is comprised may be configured to allow some packets to be sent from terminal 130 before authentication is complete. For example, packets to DHCP server 150 may be allowed to be sent before authentication is complete but packets to an external network such as the internet may be blocked until authentication is complete. Correspondingly, when terminal 130 receives an indication that access point 120 requires authentication, it can refrain from sending packets toward external networks until after authentication is complete.

An access point 120 supporting joint association and address provisioning may reply to an association request from a terminal 130, the request comprising an indication that the terminal 130 requests joint association and address provisioning, by transmitting to the terminal 130 an association response message. The association response message may comprise in addition to information relating to association, also IP address provisioning parameters. IP address provisioning parameters may include at least one of: IPv4 or IPv6 address, a network mask, a lease time, a default gateway address, a domain name server, DNS address, a DHCP server address, a network prefix, and a link local address, LLA, of a default gateway, GWY, router. In embodiments involving IPv6 address configuration, router advertisement information may also be included, with the relevant M and O bits, in the sense of RFC4861, set according to an embodiment described herein in [0032].

In some embodiments, access point 120 may request in advance from DHCP server 150 a pool of IP addresses to cache locally, for example by storing the pool in a memory comprised in access point 120. Access point 120 can then allocate an IP address and/or other parameters from this pool responsive to receiving from terminal 130 an association request that comprises an indication that joint association and address provisioning is requested. DHCP protocol extensions can be employed for this purpose, for example a container extension. Also other kinds of extensions may be used. In general, the extensions may provide a mechanism through which the DHCP server 150 can pre-allocate an IP address pool to the access point 120 for the purpose of allocating them to terminals upon association.

FIG. 3 is a messaging diagram illustrating operations relating to some embodiments of the present invention. In phase 310, access point 120 requests and receives from DHCP server 150 a pool of IP addresses, for example IPv4 and/or IPv6 addresses. The addresses are stored, or cached, by access point 120 in a local memory. A lease time associated with the IP addresses may be set to a relatively short time, for example 10 minutes. DHCP server 150 may optionally record a medium access control, MAC, address of access point 120 as a MAC address of a requesting client relating to the addresses comprised in the pool of addresses. DHCP server 150 may recognize the pool of IP addresses is for delegation to terminals from access point 120. In general, access point 120 may be configured to receive from DHCP server 150 information from which it may derive an address pool for local caching. The information may, for example, define the boundaries of the address space of the pool. The information may alternatively comprise a list of addresses comprised in the pool. The information may comprise information defining lease times associated with addresses comprised in the pool. The information may be received using a DHCP protocol, for example, or a proprietary protocol.

In phase 320, access point 120 broadcasts beacons to terminals, wherein the beacons may comprise an indication that access point 120 supports joint association and address provisioning. The beacons may also indicate that access point 120 supports provisioning IPv4 and/or IPv6 addresses. Responsive to receiving beacon 320 from access point 120, terminal 130 may decide to store the indication in an internal memory comprised in terminal 130 and attempt association with access point 120 by transmitting an association request 330, the association request 330 comprising an indication that joint association and address provisioning is requested. Association request 330 may further comprise an indication that an IPv4, or alternatively an IPv6, address is requested to be provisioned. Association request 330 may comprise a MAC address of terminal 130.

Responsive to receiving association request 330, access point 120 may be configured to provision terminal 130 before authentication by sending to terminal 130 at least one message 340 comprising at least one of: an IP address, a remaining lease time, a default gateway address, a network mask, a DNS server address, a DHCP server address, and an IPv6 prefix and LLA of a gateway where terminal 130 is IPv6 capable and has requested an IPv6 address in association request 330. Message 340 may be an association response message.

Access point 120 may optionally inform DHCP server 150 that a MAC address of terminal 130 is associated with a provisioned IPv4 address. This informing is illustrated in FIG. 3 as message 350. Message 350 may be acknowledged from DHCP server 150 to access point 120 by acknowledgement message 360.

Responsive to message 340, terminal 130 may be configured to provision its interface toward access point 120 with the information provided in message 340 and engage in an authentication procedure. Terminal 130 may be configured to refrain from trying to communicate with external networks via access point 120 until authentication is successfully concluded. An exception is a case where access point 120 is free in the sense that authentication isn't needed to access external networks via it. An authentication procedure between terminal 130 and access point 120 is illustrated in FIG. 3 by message exchange 370.

When the lease time of a provisioned IPv4 address approaches expiry, terminal 130 may be configured to attempt to renew it by sending a DHCP request 380 to the DHCP server address received during provisioning. Terminal 130 may include into the DHCP request the provisioned IPv4 address as a requested address and a MAC address of terminal 130 as a client identification MAC address. If DHCP server 150 has been informed by access point 120 of the MAC address of terminal 130 as being associated with the provisioned IPv4 address, it may be configured to renew the lease of the requested IPv4 address responsive to receiving the request to do so from terminal 130. DHCP server 150 may be configured to inform terminal 130 of agreement to renew the least by transmitting a DHCP acknowledgement message, which is illustrated in FIG. 3 as message 390.

When the provisioned IP address is an IPv6 address, terminal 130 may be configured to look at flags in the router advertisement information, bits M and O, and proceed based on their values. If bit M is set, then IP addresses are assigned by DHCP server 150 in the network, and terminal 130 should have received a lease time together with an IPv6 address from the address cache of the access point. After the lease time expiration, terminal 130 should renew its address, using DHCPv6 signaling. When the M bit is set to zero and O bit is set to 1, terminal 130 should self generate its IP address using the network prefix received and make a DHCP query for additional configuration information after authentication. All configuration parameters necessary for data communication should have been received in the association response from access point 120, where the O bit would only indicate the availability of additional configuration information from a DHCP server. When both M and O bits are set to zero, the mobile device should only generate its IPv6 address using the network prefix and not contact DHCP server 150 after successful authentication.

Although the preceding has been described in connection to a roaming scenario, the joint association and address provisioning procedure is also usable in initial association, for example when transitioning from a power-off state to a power-on state. Embodiments described herein may be used responsive to determining in terminal 130 that a SSID of a new access point is different from an SSID of a previous access point. Embodiments described herein may be used responsive to determining in terminal 130 that a new access point is associated with a different subnet than a previous access point.

FIG. 2 illustrates an example apparatus 201 capable of supporting embodiments of the present invention. The apparatus may correspond to terminal 130 or access point 120 of FIG. 1, for example, or be comprised in those apparatuses.

The apparatus is a physically tangible object, for example a mobile telephone, personal digital assistant, data dongle, access point or a similar device. The apparatus may comprise a control apparatus 210, for example a digital signal processor (DSP), processor, field-programmable gate array (FPGA), application-specific integrated circuit (ASIC), chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example information relating to an access point or information defining a pool of addresses. The memory may be solid-state memory, dynamic random access memory (DRAM), magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise a processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units or messages via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna.

Without in any way limiting the scope, interpretation, or application of the claims appearing below, a technical effect of one or more of the example embodiments disclosed herein is that overall association time between a terminal and an access point is reduced in the sense that association, authentication and address provisioning are achieved faster by performing address provisioning at least partly concurrently with association and/or authentication. Another technical effect of one or more of the example embodiments disclosed herein is that access points are enabled to delegate IP addresses to terminals and allow terminals to renew the leases of the delegated addresses by informing the MAC addresses of the respective terminals to a DHCP server.

Embodiments of the present invention may be implemented in software, hardware, application logic or a combination of software, hardware and application logic. The software, application logic and/or hardware may reside on memory 210b, apparatus 201 or control apparatus 210. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

An apparatus, comprising: memory configured to store an indicator relating to a first access point, the indicator indicating whether the first access point supports joint association and address provisioning; a transmitter configured to transmit an association request comprising an indication for joint association and address provisioning toward the first access point; a receiver configured to receive from the first access point an association response comprising at least one address provisioning parameter.

An apparatus according to the foregoing, wherein the apparatus is configured to provision an interface comprised in the apparatus with an internet protocol address based at least in part on the at least one address provisioning parameter.

An apparatus according to the foregoing, wherein the apparatus is configured to receive an indicator indicating whether the first access point supports joint association and address provisioning from a beacon message broadcast by the first access point.

An apparatus according to the foregoing, wherein the apparatus is configured to transmit a dynamic host configuration protocol request toward a dynamic host configuration protocol server address, wherein the dynamic host configuration protocol server address is obtained from the association response, wherein the dynamic host configuration protocol request comprises a medium access control address of the apparatus.

A user equipment comprising an apparatus according to the foregoing.

A method, comprising: storing an indicator relating to a first access point, the indicator indicating whether the first access point supports joint association and address provisioning; transmitting a request for joint association and address provisioning toward the first access point; and receiving from the first access point a response to the request for joint association and address provisioning.

An apparatus, comprising: at least one processor; and at least one memory including computer program code the at least one memory and the computer program code configured to, with the at least one processor, cause the apparatus to perform at least the following: broadcast a beacon message comprising an indication the apparatus supports joint association and address provisioning; receive a request message from a terminal requesting joint association and address provisioning; and transmit an association response message responsive to receiving the request message, the association response message comprising address provisioning information.

An apparatus according to the foregoing, wherein the at least one memory and the computer program code are configured to, with the at least one processor, cause the apparatus further to receive an internet protocol address pool definition from a dynamic host configuration protocol server.

An apparatus according to the foregoing, wherein the at least one memory and the computer program code are configured to, with the at least one processor, cause the apparatus further to transmit an update message to the dynamic host configuration protocol server, the update message comprising an indication that a medium access control address of the terminal is associated with an address associated with the address provisioning information.

A method, comprising: broadcasting a beacon message comprising an indication the apparatus supports joint association and address provisioning; receiving a request message from a terminal requesting joint association and address provisioning; and transmitting an association response message responsive to receiving the request message, the association response message comprising address provisioning information.

A method according to the foregoing, further comprising receiving from a dynamic host configuration protocol server information based on which an internet protocol address pool may be cached.

A method according to the foregoing, wherein the information is received using a dynamic host configuration protocol.

A computer program product comprising a computer-readable medium bearing computer program code embodied therein for use with a computer, the computer program code comprising: code for storing an indicator relating to a first access point, the indicator indicating whether the first access point supports joint association and address provisioning; code for transmitting a request for joint association and address provisioning toward the first access point; and code for receiving from the first access point a response to the request for joint association and address provisioning.

A computer program product according to the foregoing, wherein the computer program code further comprises code for receiving an indicator indicating whether a second access point supports joint association and address provisioning from a beacon message broadcast by the second access point.

A computer program product comprising a computer-readable medium bearing computer program code embodied therein for use with a computer, the computer program code comprising: code for broadcasting a beacon message comprising an indication the apparatus supports joint association and address provisioning; code for receiving a request message from a terminal requesting joint association and address provisioning; and code for transmitting an association response message responsive to receiving the request message, the association response message comprising address provisioning information.

A computer program product according to the foregoing, wherein the computer program code further comprises code for receiving an internet protocol address pool definition from a dynamic host configuration protocol server.

A computer program product according to the foregoing, wherein the computer program code further comprises code for transmitting an update message to the dynamic host configuration protocol server, the update message comprising an indication that a medium access control address of the terminal is associated with an address associated with the address provisioning information.

What is claimed is:

1. An apparatus, comprising:
   memory configured to store an indicator relating to a first access point, the indicator indicating whether the first access point supports a joint procedure for performing an association at least partly concurrently with internet protocol address provisioning;
   a transmitter configured to transmit a single association request toward the first access point comprising an indication that the apparatus requests the joint procedure for both association with the first access point and internet protocol address provisioning for the apparatus from the first access point; and
   a receiver configured to receive from the first access point a single association response comprising information relating to the association and at least an internet protocol address allocated to the apparatus, wherein the single association response is in response to the single association request.

2. The apparatus according to claim 1, wherein the apparatus is configured to receive the indicator indicating whether the first access point supports joint association and address provisioning from a beacon message broadcast by the first access point.

3. The apparatus according to claim 1, wherein the apparatus is configured to transmit a dynamic host configuration protocol request toward a dynamic host configuration protocol server address, wherein the dynamic host configuration protocol server address is obtained from the association response, wherein the dynamic host configuration protocol request comprises a medium access control address of the apparatus.

4. A user equipment comprising the apparatus according to claim 1.

5. A method, comprising:
   storing an indicator relating to a first access point, the indicator indicating whether the first access point supports a joint procedure for performing an association at least partly concurrently with internet protocol address provisioning;
   transmitting a single association request toward the first access point requesting the joint procedure for both association with the first access point and internet protocol address provisioning for the apparatus from the first access point; and
   receiving from the first access point a single association response to the request for the joint procedure for association and internet protocol address provisioning, the single association response comprising information relating to the association and an allocated internet protocol address comprising at least an internet protocol address allocated to the apparatus, wherein the single association response is in response to the single association request.

6. The method according to claim 5, wherein the received response comprises at least one address provisioning parameter.

7. The method according to claim 6, further comprising provisioning an interface with an internet protocol address based at least in part on the at least one address provisioning parameter.

8. An apparatus, comprising:
    at least one processor; and
    at least one memory including computer program code, the at least one memory and the computer program code configured to, with the at least one processor, cause the apparatus to perform at least the following:
        broadcast a beacon message comprising an indication the apparatus supports a joint procedure for performing an association at least partly concurrently with internet protocol address provisioning;
        receive a single association request message from a terminal requesting the joint procedure for both association with the first access point and internet protocol address provisioning for the apparatus; and
        transmit a single association response message responsive to receiving the single association request message, the single association response message comprising at least information relating to the association and an internet protocol address allocated to the terminal, wherein the single association response message is in response to the single association request message.

9. The apparatus according to claim 8, wherein the at least one memory and the computer program code are configured to, with the at least one processor, cause the apparatus further to receive an internet protocol address pool definition from a dynamic host configuration protocol server.

10. The apparatus according to claim 9, wherein the at least one memory and the computer program code are configured to, with the at least one processor, cause the apparatus further to transmit an update message to the dynamic host configuration protocol server, the update message comprising an indication that a medium access control address of the terminal is associated with an address associated with the address provisioning information.

11. A method, comprising:
    broadcasting a beacon message comprising an indication that an apparatus supports a joint procedure for performing an association at least partly concurrently with internet protocol address provisioning;
    receiving a single association request message from a terminal requesting the joint procedure for both association with the first access point and internet protocol address provisioning for the apparatus; and
    transmitting a single association response message responsive to receiving the single association request message, the single association response message comprising at least information relating to the association and an internet protocol address allocated to the terminal, wherein the single association response message is in response to the single association request message.

12. The method according to claim 11, further comprising receiving from a dynamic host configuration protocol server information based on which an internet protocol address pool may be cached.

13. The method according to claim 12, wherein the information is received using a dynamic host configuration protocol.

14. A computer program product comprising a non-transitory computer-readable medium bearing computer program code embodied therein for use with a computer, the computer program code comprising:
    code for storing an indicator relating to a first access point, the indicator indicating whether the first access point supports a joint procedure for performing an association at least partly concurrently with internet protocol address provisioning;
    code for transmitting a single association request toward the first access point requesting the joint procedure for both association with the first access point and internet protocol address provisioning for the apparatus from the first access point; and
    code for receiving from the first access point a single association response to the request for the joint procedure for association and internet protocol address provisioning, the single association response comprising information relating to the association and at least an internet protocol address allocated to the computer, wherein the single association response is in response to the single association request.

15. The computer program product according to claim 14, wherein the computer program code further comprises code for receiving the indicator indicating whether the second access point supports joint association and address provisioning from a beacon message broadcast by the second access point.

16. A computer program product comprising a non-transitory computer-readable medium bearing computer program code embodied therein for use with a computer, the computer program code comprising:
    code for broadcasting a beacon message comprising an indication an apparatus supports a joint procedure for performing an association at least partly concurrently with internet protocol address provisioning;
    code for receiving a single association request message from a terminal requesting the joint procedure for both association with the first access point and internet protocol address provisioning for the apparatus; and
    code for transmitting a single association response message responsive to receiving the single association request message, the single association response message comprising at least information relating to the association and an internet protocol address allocated to the terminal, wherein the single association response message is in response to the single association request message.

17. The computer program product according to claim 16, wherein the computer program code further comprises code for receiving an internet protocol address pool definition from a dynamic host configuration protocol server.

18. The computer program product according to claim 17, wherein the computer program code further comprises code for transmitting an update message to the dynamic host configuration protocol server, the update message comprising an indication that a medium access control address of the terminal is associated with an address associated with the address provisioning information.

* * * * *